United States Patent [19]

Singer et al.

[11] Patent Number: 5,814,410

[45] Date of Patent: *Sep. 29, 1998

[54] METHOD FOR PREPARING COLOR-CLEAR COMPOSITE COATINGS HAVING RESISTANCE TO ACID ETCHING

[75] Inventors: Debra L. Singer, Pittsburgh; Shanti Swarup, Gilsonia; Michael A. Mayo, Pittsburgh, all of Pa.

[73] Assignee: PPG Industries, Inc., Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 605,420

[22] Filed: Feb. 22, 1996

Related U.S. Application Data

[63] Continuation of Ser. No. 320,793, Oct. 7, 1994, which is a continuation of Ser. No. 968,795, Oct. 30, 1992, abandoned.

[51] Int. Cl.$^6$ ................................ B05D 1/36; B05D 7/16
[52] U.S. Cl. ........................ 428/423.1; 427/407.1; 427/409; 428/424.2; 428/480; 428/482; 428/483; 428/500
[58] Field of Search ............... 427/407.1, 409, 427/410; 428/423.1, 424.2, 480, 483, 482, 500

[56] References Cited

U.S. PATENT DOCUMENTS

| | | | |
|---|---|---|---|
| 2,806,840 | 9/1957 | Aycock et al. | 260/77.5 |
| 3,014,042 | 12/1961 | Mantz | 260/309.7 |
| 3,360,504 | 12/1967 | Kelley | 260/79.7 |
| 3,369,008 | 2/1968 | Hurwitz | 260/80.72 |
| 3,464,938 | 9/1969 | Nordstrom | 260/21 |
| 3,479,328 | 11/1969 | Nordstrom | 260/86.1 |
| 3,509,085 | 4/1970 | Sekmakas | 260/29.6 |
| 3,563,957 | 2/1971 | Beebe | 260/77.5 |
| 3,597,380 | 8/1971 | Bertini et al. | 260/29.4 |
| 3,901,936 | 8/1975 | Boroschewski | 260/471 C |
| 3,922,447 | 11/1975 | Isaksen et al. | 428/474 |
| 3,959,202 | 5/1976 | Blank | 260/29.4 UA |
| 4,151,142 | 4/1979 | Herman | 260/29.6 R |
| 4,255,570 | 3/1981 | Grögler et al. | 544/197 |
| 4,279,833 | 7/1981 | Culbertson et al. | 260/464 |
| 4,361,594 | 11/1982 | Winterbottom | 427/27 |
| 4,384,102 | 5/1983 | Rasshofer et al. | 528/73 |
| 4,410,679 | 10/1983 | Holubka et al. | 528/45 |
| 4,411,951 | 10/1983 | Barsotti | 428/328 |
| 4,435,559 | 3/1984 | Valko | 528/73 |
| 4,451,597 | 5/1984 | Victorius | 524/39 |
| 4,455,331 | 6/1984 | Barsotti | 428/446 |
| 4,474,978 | 10/1984 | Drent et al. | 560/24 |
| 4,501,874 | 2/1985 | Hanafin | 528/103 |
| 4,520,167 | 5/1985 | Blank et al. | 525/131 |
| 4,533,716 | 8/1985 | Okoshi et al. | 528/73 |
| 4,543,276 | 9/1985 | Parekh | 427/388.3 |
| 4,677,168 | 6/1987 | Hoy et al. | 525/441 |
| 4,708,984 | 11/1987 | Forgione et al. | 525/127 |
| 4,710,542 | 12/1987 | Forgione et al. | 525/127 |
| 4,716,204 | 12/1987 | Parker | 525/504 |
| 4,758,632 | 7/1988 | Parekh et al. | 525/383 |
| 4,812,506 | 3/1989 | Gilmer et al. | 524/512 |
| 4,837,278 | 6/1989 | Cameron et al. | 525/162 |
| 4,855,394 | 8/1989 | Goeckel et al. | 528/263 |
| 5,039,759 | 8/1991 | Hoy et al. | 525/437 |
| 5,071,904 | 12/1991 | Martin et al. | 524/458 |
| 5,093,414 | 3/1992 | Rauterkus et al. | 524/813 |
| 5,115,015 | 5/1992 | Richey, Jr. et al. | 524/507 |
| 5,115,025 | 5/1992 | Koleske et al. | 525/162 |
| 5,134,205 | 7/1992 | Blank | 525/509 |
| 5,290,602 | 3/1994 | Argyropoulos et al. | 427/421 |
| 5,300,328 | 4/1994 | Rehfuss | 427/388.3 |
| 5,356,669 | 10/1994 | Rehfuss et al. | |
| 5,532,061 | 7/1996 | Menovcik et al. | 427/385.5 |
| 5,547,757 | 8/1996 | Swarup et al. | 427/410 |
| 5,593,785 | 1/1997 | Mayo et al. | 427/388.3 |
| 5,756,213 | 5/1998 | Ohrbom et al. | 428/412 |

FOREIGN PATENT DOCUMENTS

| | | |
|---|---|---|
| 257848 | 3/1988 | European Pat. Off. . |
| 365098 | 4/1990 | European Pat. Off. . |
| 594068 | 4/1994 | European Pat. Off. . |
| 36 34 780 | 4/1987 | Germany . |
| 37 26 956A1 | 2/1989 | Germany . |
| 38 11 497A1 | 10/1989 | Germany . |
| 39 29 697A1 | 3/1991 | Germany . |
| 39 33 890A1 | 4/1991 | Germany . |
| 51-4124 | 1/1976 | Japan . |
| 929973 | 6/1963 | United Kingdom . |
| WO87/00851 | 2/1987 | WIPO . |

OTHER PUBLICATIONS

Balwant Singh et al., XVth International Conference in Organic Coatings Science and Technology, Athens, Greece 15, 385 (1989) (No Month).

*Primary Examiner*—Diana Dudash
*Attorney, Agent, or Firm*—William J. Uhl; Krisanne Shidler

[57] ABSTRACT

A color-plus-clear coating system is disclosed. A pigmented or colored basecoat is first applied to a substrate followed by the application of a transparent topcoat to the basecoat. The transparent topcoat composition is a crosslinkable composition comprising (1) a material containing a plurality of carbamate and/or urea functional groups and (2) an aminoplast crosslinking agent. The topcoat composition provides a composite coating with improved acid etch resistance, making the composite coating particularly useful as an automotive topcoat.

22 Claims, No Drawings

METHOD FOR PREPARING COLOR-CLEAR COMPOSITE COATINGS HAVING RESISTANCE TO ACID ETCHING

This is a continuation of application Ser. No. 08/320,793, filed Oct. 7, 1994, pending which is a continuation of application Ser. No. 07/968,795, filed Oct. 30, 1992 abandoned, Cross reference is also made to applicant's copending application Ser. Nos. 07/968,807 pending and 08/329,915 pending and 08/345,918, pending of which the latter two are continuation applications of earlier filed application Ser. No. 07/968,786, now abandoned.

Field of the Invention

The present invention relates to a process for preparing multi-layered coated articles comprising a pigmented or colored basecoat and a transparent or clear topcoat, and to the coated articles themselves.

BACKGROUND OF THE INVENTION

Color-plus-clear coating systems involving the application of a colored or pigmented basecoat to a substrate followed by the application of a transparent or clear topcoat to the basecoat have become conventional as original finishes for automobiles. The color-plus-clear systems have outstanding gloss and distinctness of image, and the clearcoat is particularly important for these properties.

Aminoplast-cured coating systems are also well known and provide many excellent coating properties. However, it is widely recognized that such coatings, particularly clear coats, have poor resistance to etching by acid. Conventional coating systems that contain hydroxyl functional film-forming resins and aminoplast crosslinking agents rely on a cure mechanism wherein hydroxyl groups on the resin react with the aminoplast to form ether linkages. See, for example, European Patent Application 0 257 848. Although not intending to be bound by any theory, it is believed that such ether linkages are vulnerable to acid attack and hence yield coatings with poor acid etch resistance.

Because many geographic areas encounter acidic precipitation, acid resistance in coatings is becoming an increasingly desirable property, particularly for automotive coatings. Hydroxyl-aminoplast coating systems of the prior art are not highly effective for providing protection against etching caused by acid rain.

It is desirable, therefore, to provide a color-plus-clear coating system which avoids the problems of the prior art by demonstrating improved acid etch resistance properties.

SUMMARY OF THE INVENTION

In accordance with the present invention, a process for applying a composite coating to a substrate and the coated substrate are provided. The process comprises applying to the substrate a film-forming composition to form a basecoat and applying to the basecoat a film-forming composition to form a transparent topcoat over the basecoat. The transparent topcoat, or clearcoat, is derived from (1) a material containing a plurality of terminal or pendant groups of the structure:

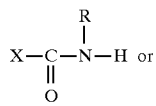

I

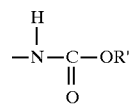

II where X is —N or —O and R is H or alkyl of 1 to 18 carbon atoms or R is bonded to X and forms part of a 5 or 6 membered ring and R's is alkyl of 1 to 18 carbon atoms; and (2) an aminoplast crosslinking agent containing methylol and or methylol ether groups. Prior to crosslinking, the clear film-forming composition comprising the material of (1) and (2) has a calculated hydroxyl value less than 50 based on solid weight of the clear film-forming composition, excluding any hydroxyl functionality which may be associated with N-methylol groups. The crosslinked clearcoat has a substantial number of urethane and/or urea crosslinks that arise from reaction of the terminal or pendant groups of structure I or II with the aminoplast, thereby providing a high level of acid etch resistance.

DETAILED DESCRIPTION

The film-forming composition of the basecoat can be any of the compositions useful in coatings applications, particularly automotive applications. The film-forming composition comprises a resinous binder and a pigment to act as the colorant. Particularly useful resinous binders are acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as an aminoplast. Other crosslinking agents such as polyisocyanates including blocked polyisocyanates may also be used Also, the acrylic polymer can be prepared with N-(alkoxymethyl)acrylamides and N-(alkoxymethyl) methacrylamides which result in self-crosslinking acrylic polymers.

Besides acrylic polymers, the resinous binder for the basecoat composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they are available or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and preferably the alkyd resins contain a portion of free hydroxyl and/or carboxyl groups which are available for further crosslinking reactions. Suitable crosslinking agents are the amine or amide-aldehyde condensates (aminoplasts) or the polyisocyanate curing agents as are well known in the art.

Polyurethanes can also be used as the resinous binder of the basecoat. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl-isocyanate). Examples of suitable higher polyisocyanates are 1,2,4 -benzene triisocyanate and polymethylene polyphenyl isocyanate.

Most of the polymers prepared as described above are organic solvent-based polymers, although acrylic polymers can be prepared via aqueous emulsion polymerization techniques and used as aqueous-based basecoat compositions. Water-based basecoats in color-plus-clear compositions are disclosed in U.S. Pat. No. 4,403,003, and the resinous compositions used in preparing these basecoats can be used in the practice of this invention. Also, water-based polyurethanes such as those prepared in accordance with U.S. Pat. No. 4,147,679 can be used as the resinous binder in the basecoat. Further, water-based coatings such as those described in U.S. Pat. 5,071,904 can be used as the basecoat.

The basecoat also contains pigments to give it color. Compositions containing metallic flake pigmentation are useful for the production of so-called "glamour metallic" finishes chiefly upon the surface of automobile bodies. Proper orientation of the metallic pigments results in a lustrous shiny appearance with excellent flop. By flop is meant the visual appearance of brightness or lightness of the metallic coating with a change in viewing angle, that is, a change from 90 to 180 degrees. The greater the change from light to dark appearance with respect to viewing angle, the better the flop. Flop is important because it accentuates the lines of a curved surface such as on an automobile body. Suitable metallic pigments include in particular aluminum flake, copper bronze flake and mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the basecoat composition may contain additional materials well known in the art of formulated surface coatings. These would include surfactants, flow control agents, thixotropic agents, fillers, anti-gassing agents, organic co-solvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

Coatings of the present invention can be applied over virtually any substrate including wood, metals, glass, cloth, plastic, foam, including elastomeric substrates and the like. They are particularly useful in applying over metals and elastomeric substrates that are found on motor vehicles.

During application of the basecoat composition to the substrate, a film of the basecoat is formed on the substrate. Typically, the basecoat thickness will be about 0.01 to 5, preferably 0.1 to 2 mils in thickness.

After application of the basecoat to the substrate, a film is formed on the surface of the substrate by driving solvent, i. e., organic solvent or water, out of the basecoat film by heating or by an air drying period. Preferably, the heating will only be sufficient and for a short period of time to ensure that the topcoat can be applied to the basecoat without the former dissolving the basecoat composition. Suitable drying conditions will depend on the particular basecoat composition, and on the ambient humidity with certain water-based compositions, but in general a drying time of from about 1 to 5 minutes at a temperature of about 80–250°F. (20–121°C.) will be adequate to ensure that mixing of the two coats isominimized. At the same time, the basecoat film is adequately by the topcoat composition so that satisfactory intercoat adhesion is obtained. Also, more than one base coat and multiple top coats may be applied to develop the optimum appearance. Usually between coats, the previously applied coat is flashed; that is, exposed to ambient conditions for about 1 to 20 minutes.

The clear film-forming composition which forms the transparent topcoat or clearcoat is a crosslinkable composition comprising (1) a material containing a plurality of pendant or terminal groups of the structure:

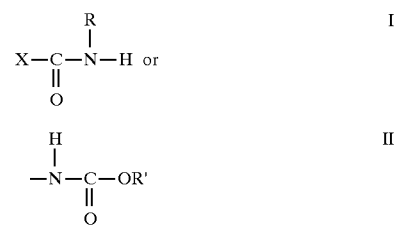

where X is —N or —O and R is H or alkyl of 1 to 18, preferably 1 to 6 carbon atoms or R is bonded to X and forms part of a five- or six-membered ring and R's is alkyl of 1 to 18, preferably 1 to 6 carbon atoms; and (2) an aminoplast crosslinking agent containing methylol and/or methylol ether groups. The material of (1) has on average at least two pendant or terminal groups of structure I and/or II, preferably structure I, per molecule. Preferably X=—0. The material of (1) may be a polymer or oligomer such as an acrylic polymer, a polyester polymer or oligonier, a polyurethane polymer or oligomer, or a blend of two or more of these materials. Acrylic polymers are preferred. Prior to crosslinking, the clear film-forming composition of (1) and (2) has a calculated hydroxyl value of less than 50, preferably less than 25, and more preferably 0, based on solid weight of the clear film-forming composition, excluding any hydroxyl functionality associated with N-methylol groups such as those in the aminoplast and any hydroxyl functionality which may be associated with N-methylol groups incorporated into the material of (l) such as N-methylol acrylamide groups in the acrylic polymer. By calculated hydroxyl value is meant the calculated value based on the relative amounts of the various ingredients used in making the clear film-forming composition, rather than the actual hydroxyl value which is measured on the clear film-forming composition itself by conventional techniques. The resultant crosslinked clearcoat contains a substantial number of urethane and/or urea crosslinks that arise from reaction of the terminal or pendant groups of structure I or II with the aminoplast, thereby providing a high level of acid etch resistance.

The acrylic materials are copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Other suitable polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; vinyl esters such as vinyl acetate; and acid functional monomers such as acrylic and methacrylic acid.

Hydroxyl functional monomers such as hydroxyethyl acrylate, hydroxypropyl acrylate, hydroxyethyl methacrylate, and hydroxypropyl methacrylate, may be copolymerized with the acrylic monomers to impart hydroxyl functionality to the acrylic material in accordance with the calculated hydroxyl values mentioned above.

Pendant carbamate functional groups of structure I (X=—0) may be incorporated into the acrylic polymer by copolymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate (yielding structure I), or the reaction product of hydroxypropyl methacrylate, isophorone diisocyanate, and methanol (yielding structure II). Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. 3,479,328 . Pendant carbamate groups can also be incorporated into the acrylic polymer by reacting a hydroxyl functional acrylic polymer with a low molecular weight alkyl carbamate such as methyl carbamate. Reference is made to Japanese Kokai 51-4124 . Also, hydroxyl functional acrylic polymers can be reacted with isocyanic acid yielding pendant carbamate groups. Note that the production of isocyanic acid is disclosed in U.S. Pat. 4,364.913 . Likewise, hydroxyl functional acrylic polymers can be reacted with urea to give an acrylic polymer with pendant carbamate groups.

Pendant urea groups of structure I (X=—N) may be incorporated into the acrylic polymer by copolymerizing the acrylic monomers with urea functional vinyl monomers such as urea functional alkyl esters of acrylic acid or methacrylic acid. Examples include the condensation product of acrylic acid or methacrylic acid with a hydroxyalkyl ethylene urea such as hydroxyethyl ethylene urea. Other urea functional monomers are, for example, the reaction product of hydroxyethyl methacrylate, isophorone diisocyanate, and hydroxyethyl ethylene urea.

Mixed pendant carbamate and urea groups may also be used.

The acrylic polymer material may be prepared by solution polymerization techniques in the presence of suitable catalysts such as organic peroxides or azo compounds, for example, benzoyl peroxide or N,N-azobis(isobutyronitrile). The polymerization may be carried out in an organic solution in which the monomers are soluble by techniques conventional in the art. Alternately, the acrylic polymer may be prepared by aqueous emulsion or dispersion polymerization techniques well known in the art.

The acrylic material typically has a number average molecular weight of from about 900 to 13,000, preferably from about 1000 to 5000 as determined by gel permeation chromatography using a polystyrene standard, and an equivalent weight of less than 5000, preferably within the range of 140 to 2500, based on equivalents of reactive pendant or terminal carbamate or carbamate and/or urea groups. The equivalent weight is a calculated value based on the relative amounts of the various ingredients used in making the acrylic material and is based on solids of the acrylic material.

Polyesters may also be used in the formulation of the clear film-forming composition and may be prepared by the polyesterification of a polycarboxylic acid or anhydride thereof with polyols and/or an epoxide. Usually, the polycarboxylic acids and polyols are aliphatic or aromatic dibasic acids and diols.

The polyols which are usually employed in making the polyester include alkylene glycols, such as ethylene glycol, 1,6-hexanediol, neopentyl glycol, 2,2-dimethyl-3-hydroxypropyl-2,2- dimethyl-3-hydroxypropionate and other glycols, such as hydrogenated Bisphenol A, cyclohexanediol, cyclohexanedimethanol, caprolactone-based diols, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are phthalic acid, isophthalic acid, terephthalic acid, tetrahydrophthalic acid, hexahydrophthalic acid, methyl hexahydrophthalic anhydride. adipic acid, azelaic acid, sebacic acid, maleic acid, glutaric acid, decanoic diacid, dodecanoic diacid and other dicarboxylic acids of various types. The polyester may include minor a mounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of the acids such as dimethyl glutarate and dimethyl terephthalate may be used.

Pendant carbamate functional groups of structure I may be incorporated into the polyester by first forming a hydroxyalkyl carbamate which can be reacted with the polyacids and polyols used in forming the polyester. A polyester oligomer may be prepared by reacting a polycarboxylic acid such as those mentioned above with a hydroxyalkyl carbamate. An example of a hydroxyalkyl carbamate is the reaction product of ammonia and ethylene carbonate or propylene carbonate. The hydroxyalkyl carbamate is condensed with acid functionality on the polyester or polycarboxylic acid, yielding pendant carbamate functionality. Pendant carbamate functional groups of structure I may also be incorporated into the polyester by reacting isocyanic acid or a low molecular weight alkyl carbamate such as methyl carbamate with a hydroxyl functional polyester. Also, pendant carbamate functionality may be incorporated into the polyester by reacting a hydroxy functional polyester with urea.

Pendant urea groups of structure I may be incorporated into the polyester by reacting a hydroxyl functional urea such as a hydroxyalkyl ethylene urea with the polyacids and polyols used in making the polyester. A polyester oligomer can be prepared by reacting a polyacid with a hydroxyl functional urea. Also, isocyanate terminated polyurethane or polyester prepolymers may be reacted with primary amines, aminoalkyl ethylene urea, or hydroxyalkyl ethylene urea to yield materials with pendant urea groups. Preparation of these polymers is known in the art and is described in U.S. Pat. No. 3,563,957.

Mixed pendant carbamate and urea groups may also be used in the polyester material.

Polyurethanes can be formed by reacting a polyisocyanate with a polyester having hydroxyl functionality and containing the pendant carbamate and/or urea groups. Alternatively, the polyurethane can be prepared by reacting a polyisocyanate with a polyester polyol and a hydroxyalkyl carbamate or isocyanic acid as separate reactants. Examples of suitable polyisocyanates are aromatic and aliphatic polyisocyanates, with aliphatic being preferred because of better color and durability properties. Examples of suitable aromatic diisocyanates are 4,4'-diisocyanate, 1,3-phenylene diisocyanate. 1,4-phenylene diisocyanate, and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed and are preferred because of imparting hardness to the product. Examples include 1,4-cyclohexyl diisocyanate, isophorone diisocyanate, alpha,alpha-xylylene diisocyanate and 4,4'-methylene-bis-(cyclonhexylisocyanate).

The polyester or polyurethane materials typically have number average molecular weights of about 300 to 3000, preferably about 300 to 600 in solvent borne systems and about 900 to 1500 in water borne systems as determined by gel permeation chromatography using a polystyrene standard., and an equivalent weight of from about 140 to 2500 based on equivalents of pendant carbamate and/or urea groups. The equivalent weight is a calculated value based on the relative amounts of the various ingredients used in making the polyester or polyurethane and is based on solids of the material Besides polymeric materials, relatively low molecular weight materials containing pendant carbamate functional groups of structure II may be formed by reacting isocyanate terminated monomers or oligomers, such as an isocyanurate of polymeric 1,6-hexamethylene diisocyanate, with an alcohol. Any suitable aliphatic, cycloaliphatic, aromatic alkyl monoalcohol or phenolic compound may be used, such as, for example, aliphatic alcohols containing from 1 to 18, preferably lower aliphatic alcohols containing from 1 to 6 carbon atoms such as methanol, ethanol, n-butyl alcohol and n-hexanol; cycloaliphatic alcohols such as cyclohexanol: aromatic-alkyl alcohols such as phenyl carbinol and methylphenyl carbinol; phenolic compounds such as phenol itself, and substituted phenols in which the substituents do not adversely affect coating operations Examples include cresol and nitrophenol.

It is possible to prepare blends of the acrylic, polyester, and polyurethane materials containing pendant or terminal carbamate and/or urea groups described above. It is also possible to prepare blends of the low molecular weight materials containing pendant carbamate and/or urea groups with the polymeric materials containing pendant carbamate and/or urea groups. The weight ratio of low molecular weight materials to polymeric materials may range from 10:90 to 90:10, preferably 10:90 to 40:60.

The clear film-forming composition also includes an aminoplast crosslinking agent containing methylol and/or methylol ether groups. Aminoplast condensates are obtained from the reaction of formaldehyde with an amine or amide. The most common amines or amides are melamine, urea, or benzoguanamine, and are preferred. However, condensates with other amines or amides can be used for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, and hexanol.

Preferably, the aminoplasts which are used are melamine-, urea-, or benzoguanamine-formaldehyde condensates etherified with an alcohol containing from 1 to 6 carbon atoms. The aminoplast is present in amounts of about 1 to 80, preferably 10 to 50 percent by weight based on weight of resin solids in the clear film-forming composition. The equivalent ratio of pendant or terminal carbamate and/or urea functional groups of structure I and II above to methylol or methylol ether groups is 0.5 to 2:1 based on calculated equivalent weights, and being sufficient to form a crosslinked film.

The clear film-forming composition may be solvent borne, in which the carbamate and/or urea functional materials are dissolved in one or more nonreactive organic solvents. Suitable components of the solvent system which may be used are alcohols such as n-propanol and n-butanol, ethers such as ethylene glycol dibutyl ether and diethylene glycol dibutyl ether, ketones such as methyl ethyl ketone, methyl isobutyl ketone, methyl amyl ketone and methyl N-butyl icetone; esters such as butyl acetate, 2-ethoxyethyl acetate and hexyl acetate - aliphatic and alicyclic hydrocarbons such as the various petroleum naphthas and cyclohexane; and aromatic hydrocarbons such as toluene and xylene. The amount of solvent used generally can range from about 0 to 55 percents, preferably from about 0 to 50 percent, and most preferably from about 40 to 50 percent by weight based on the total weight of the coating composition.

clear film-forming composition may also be waterborne. For example, acid-functional materials having terminal or pendant carbamate and/or urea groups may be neutralized with amines and dissolved or dispersed in water. Also, it is possible to prepare an aqueous dispersion of a blend of acrylic and polyester and/or polyurethane materials with pendant carbamate and/or urea groups in microparticulate form by a high stress technique using a homogenizer. This technique is described in U.S. Pat. No. 5,071,904.

Powder coatings, i.e., film-forming composition is a solid, may also be prepared from the carbamate and/or urea functional materials of the present invention. Monomers used to form the carbamate and/or urea functional materials are selected such that the resultant material has a high glass transition temperature (Tg); that is, greater than 60° C. This material can then be combined with an aldehyde condensate of glycoluril as mentioned above to form the resinous binder of the powder coating composition. Preferably, the film-forming composition is a liquid.

The clear film-forminig composition will also preferably contain catalysts to accelerate the cure of the aminoplast and carbamate or urea groups. Examples of suitable catalysts are acidic materials and include sulfonic acids or substituted sulfonic acids such as para-toluenesulfonic acid. The catalyst is usually present in an amount of about 0.5 to 5.0 percent by weight, preferably about 1 to 2 percent by weight, based on weight of total resin solids. Optional ingredients such as, for example, plasticizers, flow controllers, anti-oxidants, UV light absorbers and similar additives conventional in the art may be included in the composition. These ingredients are typically present at up to 25 % by weight based on total resin solids.

The clear topcoat composition may be applied to the basecoated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clearcoat composition to the basecoat, the coated substrate is heated to cure the coating layers. In the curing operation, solvents are driven off and the film-forming materials of the clearcoat and the basecoat are each crosslinked. The heating or curing operation is usually carried out at a temperature in the range of from 160°C–350° F (71° C–177° C) but if needed, lower or higher temperatures may be used as necessary to activate crosslinking mechanisms. The thickness of the clearcoat is usually from about 0.5–5, preferably 1.2–3 mils.

The invention will further be described by reference to the following examples. Unless otherwise indicated, all parts are by weight.

EXAMPLES

The following examples (Examples A–N) show the preparation of carbamate and/or urea functional materials and corresponding hydroxyl functional materials.

Example A

A carbamate functional acrylic monomer was prepared from the following ingredients:

| Ingredient | Weight in Grams |
| --- | --- |
| isophorone diisocyanate (IPDI) | 888.0 |
| dibutyl tin dilaurate | 4.6 |
| 2,6-di-t-butyl methyl phenol | 2.6 |
| butyl methacrylate | 282.0 |
| hydroxypropyl carbamate | 571.2 |
| hydroxyethyl methacrylate | 416.0 |

A suitable reactor was charged with the first four ingredients and heated to a temperature of 60° C. The hydroxypropyl carbamate was added to the reaction mixture over 2 hours. The reaction mixture was then held at 60° C until the isocyanate equivalent weight became constant. The hydroxyethyl methacrylate was then added over 2 hours, and the reaction held until infrared analysis indicated the absence of isocyanate. The product was diluted with 346.0 g of butyl methacrylate. The final product had a solids content of 75 % and had a number average molecular weight of 622 as determined by gel permeation chromatography.

Example B

A low molecular weight, carbamate functional material was prepared from the following ingredients :

| Ingredient | Weight in Grams |
| --- | --- |
| DESMODUR N-3300[1] | 3300.0 |
| dibutyl tin dilaurate | 4.0 |
| butyl acetate | 1592.0 |
| methanol | 613.7 |

[1]Isocyanurate of hexamethylene diisocyanate, available from Miles, Inc.

A suitable reactor was charged with the first three ingredients and heated to a temperature of 60° C. The methanol was added to the reaction mixture over 2 hours. The temperature rose to 74° C and then was held at 80° C until infrared analysis indicated the absence of isocyanate (one and a half hours). The final product had a Gardner-Holdt viscosity of N–0 and a number average molecular weight of 961 as determined by gel permeation chromatography.

Example C

| Ingredient | Weight in Grams |
| --- | --- |
| hydroxyethyl acrylate | 200.0 |
| butyl methacrylate | 584.0 |
| α-methyl styrene dimer | 16.0 |
| LUPERSOL 555M60[1] | 80.0 |
| t-butyl perbenzoate | 24.0 |

[1]t-amyl peracetate available from Atochem.

A hydroxyl functional acrylic polymer was prepared from the following ingredients:

A blend of EKITAPRO EEP (ethyl 3-ethoxypropionate available from Eastman Chemicals, 236.8 g) and butyl acetate (105.2 g) was charged to a suitable reactor and heated to reflux. The first three ingredients were mixed with 50 g EKTAPRO EEP. The t-amyl peracetate and 80 g EKTAPRO EEP were also mixed together. The premixture of acrylic monomers and the premixture of initiator were added simultaneously to the reaction vessel over a period of about 3 hours while maintaining the reaction at reflux. At the completion of the addition, the reaction mixture was held at reflux for one hour followed by the addition of 8.0 g t-butyl perbenzoate over about 30 minutes. The reaction was then held for 30 minutes at reflux. 8.0 more grams of t-butyl perbenzoate was added over 30 minutes and the reaction held for 30 minutes at reflux. The remainder of t-butyl perbenzoate was added over 30 minutes and the reaction held at reflux for two hours. An additional total of about 54 grams of EKTAPRO EEP was added to the reaction mixture to adjust the solids content to about 60%. The reaction mixture was then cooled to room temperature. The final product had a solids content of 57% and had a number average molecular weight of 1220 as determined by gel permeation chromatography. The acrylic polymer had a hydroxyl number of about 92.2 based on solids.

Example D

A carbamate functional acrylic polymer was prepared from the following ingredients:

| Ingredient | Weight in Grams |
|---|---|
| butyl acetate | 332.0 |
| EKTAPRO EEP | 103.0 |
| carbamate functional acrylic monomer from Example A | 349.9 |
| butyl methacrylate | 279.1 |
| α-methyl styrene dimer | 12.5 |
| t-amyl peracetate | 63.2 |
| butyl acetate | 81.4 |

A suitable reactor was charged with the first two ingredients and heated to reflux. The carbamate functional acrylic monomer, butyl methacrylate and α-methyl styrene dimer were added to the reaction mixture over 3 hours. The t-amyl peracetate and butyl acetate were then added over 3.5 hours. The reaction was then held at reflux for one hour, and cooled to room temperature. The final product had a solids content of 49.9% and had a number average molecular weight of 1346 as determined by gel permeation chromatography. The carbamate equivalent weight of the resultant material was approximately 900.

Example E

A carbamate functional acrylic polymer dispersed in aqueous medium was prepared from the following ingredients:

| Ingredient | Weight in Grams |
|---|---|
| n-propanol | 350.0 |
| butyl acrylate | 202.0 |
| methyl methacrylate | 195.2 |
| carbamate functional acrylic monomer from example A | 349.9 |
| acrylic acid | 25.0 |
| t-dodecyl mercaptan | 3.2 |
| t-butyl peroctoate | 14.4 |
| n-propanol | 46.4 |
| dimethyl ethanol amine (DMEA) | 23.2 |
| water | 700.0 |

A suitable reactor was charged with the n-propanol and heated to reflux. The next five ingredients were added to the reaction mixture over 3 hours. At the same time, the t-butyl peroctoate and 46.4 g n-propanol were added over 3.5 hours. The reaction was then held at reflux for one hour. The DMEA was added to the reaction mixture at about 95° C., followed by addition of the water. The reaction cooled to room temperature. The final product had a solids content of 35.3% and had a number average molecular weight of 3728 as determined by gel permeation chromatography. The carbamate equivalent weight of the resultant material was approximately 1040.

Example F

A carbamate functional acrylic latex was prepared from the following ingredients:

| Ingredient | Weight in Grams |
|---|---|
| Feed A: | |
| water | 783.4 |
| ALIPAL CO-436[1] | 15.1 |
| sodium bicarbonate | 1.8 |
| Feed B: | |
| water | 114.8 |
| ammonium persulfate | 5.2 |
| Feed C: | |
| butyl acrylate | 277.5 |
| methyl methacrylate | 263.7 |
| carbamate functional acrylic monomer from Example A | 502.0 |
| butyl methacrylate | 136.9 |
| acrylic acid | 36.4 |
| t-dodecyl mercaptan | 18.2 |
| water | 757.7 |
| ALIPAL CO-436 | 17.4 |
| DDBSA-DMEA[2] | 11.5 |
| Feed D: | |
| diisopropanol amine, 50% in water | 67.2 |

[1]Anionic ethoxylated nonyl phenol available from GAF Corporation.
[2]DDBSA-DMEA solution was prepared by dissolving 1 mole dodecyl benzene sulfonic acid in water containing 1 mole dimethyl ethanolamine.

A suitable reactor was charged with Feed A and heated to 80° C. 25 g of Feed C and then all of Feed B were added to the reaction mixture, and the mixture was held for 20 minutes. The remainder of Feed C was added over 3 hours. The reaction was held at 80° C. for two hours, and then cooled to room temperature. After dilution with Feed D, the final product had a solids content of 42.8% and had a number average molecular weight of 12,393 as determined by gel permeation chromatography. The carbamate equivalent weight of the resultant material was approximately 1140.

Example G

A urea functional polyester oligomer was prepared from the following ingredients:

| Ingredient | Weight in Grams |
|---|---|
| Methylhexahydrophthalic anhydride | 840.95 |
| hydroxyethylethylene urea[1] | 1275.47 |
| butyl stannoic acid | 2.12 |
| triphenyl phosphite | 4.23 |
| xylene | 226.1 |
| water | 101.7 |
| n-propanol | 406.9 |

[1]Available from Union Carbide as UCar RD-65-1.

The first five ingredients were charged to a suitable reactor equipped with a nitrogen sparge and Dean-Stark trap and heated to reflux. As water was removed from the reaction ( 88.2 g), the acid value of the reaction mixture dropped to less than 5. The reaction mixture was then vacuum stripped to remove xylene, cooled to 70° C, and diluted with the n-propanol and water. The reaction mixture had a final measured solids content of 77%, a number average molecular weight of 177 and a weight average molecular weight of about 247 as determined by gel permeation chromatography using a polystyrene standard.

Example H

A carbamate functional polyester oligomer was prepared from the following ingredients:

| Ingredient | Weight in Grams |
|---|---|
| Methylhexahydrophthalic anhydride | 505.68 |
| ESTERDIOL 204[1] | 716.04 |
| butyl stannoic acid | 2.12 |
| urea | 120 |
| xylene | 50 |
| n-propanol | 1180 |

[1] 2,2-dimethyl-3-hydroxypropyl-2,2-dimethyl-3-hydroxypropionate available from Union Carbide.

The first three ingredients were charged to a suitable reactor equipped with a nitrogen sparge and Dean-Stark trap and heated to reflux. As water was removed from the reaction, the acid value of the reaction mixture dropped to less than 1. The reaction mixture was then cooled to 150° C., and the urea and xylene were added. The reaction mixture was held at reflux for 28 hours and then vacuum stripped to remove xylene. After dilution with the n-propanol, the reaction mixture had a final measured solids content of 52.6%, and a viscosity of A on the Gardner-Holdt scale.

Example I

A carbamate functional polyester was prepared from the following ingredients:

| Ingredient | Weight in Grams |
|---|---|
| DOWANOL PM carbamate[2] | 332.5 |
| polyester[1] | 455 |
| butyl stannoic acid | 2.12 |

[1] Reaction product of hexahydrophthalic anhydride, ESTERDIOL 204, and 1,6-hexanediol in a 1:1:1 mole ratio.
[2] Reaction product of DOWANOL PM and urea, 95% in DOWANOL PM which is the monomethyl ether of propylene glycol and is available from the Dow Chemical Co.

The ingredients were charged to a suitable reactor equipped with a nitrogen sparge and Dean-Stark trap and heated to 140–145° C.. DOWANOL PM was removed from the reaction under reduced pressure. The reaction mixture was held until DOWANOL PM carbamate was no longer detectable on a gas chromatograph. The resultant reaction mixture was a soft, waxy, opaque material.

Example J

A pre-emulsion was prepared by stirring together the ingredients:

| Ingredient | Weight in Grams |
|---|---|
| carbamate functional polyester of Example I | 125.0 |
| methyl methacrylate | 100.0 |
| butyl acrylate | 100.0 |
| stearyl methacrylate | 25.0 |
| N-methylol acrylamide (48% solution in water) | 83.4 |
| methacrylic acid | 10.0 |
| dodecylbenzenesulfonic acid (70% in water) | 14.3 |
| N,N-dimethyl ethanol amine | 2.5 |
| IGEPAL CO-897[1] | 7.2 |
| ferrous ammonium sulfate, 1% in water | 2.5 |
| water | 500.0 |

[1] Nonionic ethoxylated nonyl phenol available from GAF Corp.

The pre-emulsion was passed though an M110 MICROFLUIDIZER high pressure impingement emulsifier (available from Microfluidics, Inc.) at 8000 psi to produce a bluish-white emulsion. The emulsion was transferred to a suitable reactor and blanketed with nitrogen. Polymerization was initiated by adding first a mixture of 1.5 g isoascorbic acid and 2.5 g mercaptopropionic acid dissolved in 50.0 g water followed by a solution of 2.19 g hydrogen peroxide (35%) in 25.0 g water added dropwise over 15 minutes. The emulsion exothermed from 26 to 66° C. over 14 minutes. Any remaining monomer was then polymerized by adding 0.5 g isoascorbic acid dissolved in 5.0 g water followed by 0.5 g of 35% hydrogen peroxide. An additional exotherm from 56 to 59° C. was observed. The pH of the latex was increased to 7.0 with 16.45 g of a 1:1 mixture of water and diisopropanolamine. The final product had a solids content of 41.0%.

Example K

A urea functional polyester oligomer was prepared from the following ingredients:

| Ingredient | Weight in Grams |
|---|---|
| dodecanedioic acid | 575.0 |
| hydroxyethyl ethylene urea | 637.74 |
| butyl stannoic acid | 1.21 |
| xylene | 198.66 |

The ingredients were charged to a suitable reactor and heated to reflux to remove water through a Dean-Stark trap. The temperature of the reaction mixture was held at reflux until the acid value was less than 5. The reaction mixture was then cooled to 120° C. and volatile materials in the reaction mixture were removed under vacuum to a solids content of 98.7%. The reaction mixture was diluted to a final solids content of 65% with an 80:20 weight mixture of propanol:water. The product had a number average molecular weight of 606 and a urea equivalent weight of approximately 230.

Example L

A carbamate functional acrylic monomer was prepared from the following ingredients:

| Ingredient | Weight in Grams |
|---|---|
| hydroxypropyl carbamate | 600.0 |
| 2,6-di-t-butyl methyl phenol | 3.9 |
| triphenyl phosphite | 2.22 |
| methacrylic anhydride | 810.0 |

-continued

| Ingredient | Weight in Grams |
|---|---|
| toluene | 1200.0 |
| sodium hydroxide (16.7%) | 1260.0 |

A suitable reactor was charged with the first four ingredients and heated to 100° C.. The reaction mixture was held at this temperature until the methacrylic anhydride had completely reacted with the hydroxypropyl carbamate, as determined by gas chromatography. The reaction was cooled to room temperature and the toluene and sodium hydroxide were added. After agitating for about 30 minutes, the reaction mixture was transferred to a separatory funnel. The top layer, containing the product in toluene, was collected in a flask and the toluene was removed by vacuum distillation.

Example M

A carbamate functional acrylic latex was prepared from the following ingredients:

| Ingredient | Weight in Grams |
|---|---|
| Feed A: | |
| water | 450.0 |
| ALIPAL CO-436 | 9.3 |
| sodium bicarbonate | 0.8 |
| Feed B: | |
| water | 50.0 |
| ammonium persulfate | 2.2 |
| Feed C: | |
| carbamate functional acrylic monomer of Example L | 180.0 |
| butyl acrylate | 240.0 |
| methyl methacrylate | 120.0 |
| styrene | 60.0 |
| acrylic acid | 16.8 |
| t-dodecyl mercaptan | 9.0 |
| water | 400.0 |
| ALIPAL CO-436 | 18.0 |
| PGNP-15[1] | 26.0 |
| Feed D: | |
| diisopropanol amine, 50% in water | 20.0 |

[1]Nonionic surfactant prepared by reacting 1 mole of nonyl phenol with 15 moles of glycidol.

A suitable reactor was charged with Feed A and heated to 80° C. 25 g of Feed C and then all of Feed B were added to the reaction mixture, and the mixture was held for 20 minutes. The remainder of Feed C was added over 3 hours. The reaction was held at 80° C. for two hours, and then cooled to room temperature. After addition of Feed D, the pH was 7.7. The final product had a solids content of 40.5% and had a number average molecular weight of 5706 as determined by gel permeation chromatography.

Example N

A hydroxyl functional acrylic latex was prepared from the following ingredients:

| Ingredient | Weight in Grams |
|---|---|
| Feed A: | |
| water | 450.0 |
| ALIPAL CO-436 | 9.3 |
| sodium bicarbonate | 0.8 |
| Feed B: | |
| water | 50.0 |
| ammonium persulfate | 2.2 |
| Feed C: | |
| hydroxyethyl acrylate | 180.0 |
| butyl acrylate | 240.0 |
| methyl methacrylate | 120.0 |
| styrene | 60.0 |
| acrylic acid | 16.8 |
| t-dodecyl mercaptan | 9.0 |
| water | 400.0 |
| ALIPAL CO-436 | 18.0 |
| PGNP-15 | 26.0 |
| Feed D: | |
| diisopropanol amine, 50% in water | 20.0 |

A suitable reactor was charged with Feed A and heated to 80° C. 25 g of Feed C and then all of Feed B were added to the reaction mixture, and the mixture was held for 20 minutes. The remainder of Feed C was added over 3 hours. The reaction was held at 80° C. for two hours, and then cooled to room temperature. After addition of Feed D, the pH was 7.84. The final product had a solids content of 40.2% and had a number average molecular weight of 5123 as determined by gel permeation chromatography, and a hydroxyl value of 22 based on solids content.

The following examples (1–12) show the preparation of various clear film-forming compositions prepared with carbamate, urea, or hydroxyl functional materials and aminoplast curing agents. The coating compositions were evaluated in color-plus-clear applications.

Example 1

A clear film-forming composition was prepared by mixing together the following ingredients:

| Ingredient | Solid weight in grams | Solution weight in grams |
|---|---|---|
| n-butyl acetate | — | 7.0 |
| EKTAPRO EEP | — | 19.0 |
| TINUVIN 1130[1] | 3.0 | 3.0 |
| TINUVIN 292[2] | 0.3 | 0.3 |
| polybutylacrylate[3] | 0.4 | 0.7 |
| flow control agent[4] | 1.0 | 2.3 |
| CYMEL 327[5] | 30.0 | 33.3 |
| carbamate containing acrylic of Example D | 69.0 | 138.8 |
| phenyl acid phosphate | 1.0 | 1.2 |

[1]Substituted benzotriazole UV light stabilizer available from Ciba Geigy Corporation.
[2]Sterically hindered tertiary amine light stabilizer available from Ciba Geigy Corporation.
[3]A flow control agent having a Mw of about 6700 and Mn of about 2600 made in xylene 62.5% solids.
[4]Polymeric microparticle prepared in accordance with example 11 of U.S. Pat. No. 4,147,688.
[5]Highly methylated, high imino content aminoplast resin available from American Cyanamid.

Example 2

A clear film-forming composition was prepared by mixing together the following ingredients:

| Ingredient | Solid weight in grams | Solution weight in grams |
| --- | --- | --- |
| hexyl acetate | — | 7.0 |
| EKTAPRO EEP | — | 15.1 |
| TINUVIN 1130 | 3.0 | 3.0 |
| TINUVIN 292 | 0.3 | 0.3 |
| polybutylacrylate | 0.4 | 0.7 |
| flow control agent | 1.0 | 2.3 |
| CYMEL 327 | 30.0 | 33.3 |
| carbamate containing acrylic of Example D | 49.0 | 97.0 |
| hydroxyl containing acrylic of Example C | 20.0 | 35.1 |
| phenyl acid phosphate | 1.0 | 1.2 |

Example 3

A clear film-forming composition was prepared by mixing together the following ingredients:

| Ingredient | Solid weight in grams | Solution weight in grams |
| --- | --- | --- |
| hexyl acetate | — | 7.0 |
| EKTAPRO EEP | — | 18.8 |
| TINUVIN 1130 | 3.0 | 3.0 |
| TINUVIN 292 | 0.3 | 0.3 |
| polybutylacrylate | 0.4 | 0.7 |
| flow control agent | 1.0 | 2.3 |
| CYMEL 327 | 30.0 | 33.3 |
| carbamate containing acrylic of Example D | 29.0 | 57.3 |
| hydroxyl containing acrylic of Example C | 40.0 | 70.1 |
| phenyl acid phosphate | 1.0 | 1.2 |

Example 4

A clear film-forming composition was prepared by mixing together the following ingredients:

| Ingredient | Solid weight in grams | Solution weight in grams |
| --- | --- | --- |
| hexyl acetate | — | 7.0 |
| EKTAPRO EEP | — | 19.3 |
| TINUVIN 1130 | 3.0 | 3.0 |
| TINUVIN 292 | 0.3 | 0.3 |
| polybutylacrylate | 0.4 | 0.7 |
| flow control agent | 1.0 | 2.3 |
| CYMEL 327 | 30.0 | 33.3 |
| carbamate containing acrylic of Example D | 9.0 | 17.8 |
| hydroxyl containing acrylic of Example C | 60.0 | 105.1 |
| phenyl acid phosphate | 1.0 | 1.2 |

Example 5

A clear film-forming composition was prepared by mixing together the following ingredients:

| Ingredient | Solid weight in grams | Solution weight in grams |
| --- | --- | --- |
| n-butyl acetate | — | 7.0 |
| EKTAPRO EEP | — | 15.0 |
| TTNUVIN 1130 | 3.0 | 3.0 |
| TINUVIN 292 | 0.3 | 0.3 |
| polybutylacrylate | 0.4 | 0.7 |
| flow control agent | 1.0 | 2.3 |
| CYMEL 327 | 30.0 | 33.3 |
| hydroxyl containing acrylic of Example C | 69.0 | 120.7 |
| phenyl acid phosphate | 1.0 | 1.2 |

Example 6

A clear film-forming composition was prepared by mixing together the following ingredients:

| Ingredient | Solid weight in grams | Solution weight in grams |
| --- | --- | --- |
| n-amyl alcohol | — | 35.1 |
| TINUVIN 1130 | 3.0 | 3.0 |
| TTNUVIN 292 | 0.3 | 0.3 |
| polybutylacrylate | 0.4 | 0.7 |
| low molecular weight carbamate functional material of Example B | 11.1 | 15.9 |
| carbamate functional acrylic of Example D | 32.5 | 64.2 |
| urea functional polyester of Example G | 11.1 | 14.4 |
| carbamate functional polyester of Example H | 10.3 | 17.3 |
| phenyl acid phosphate | 1.0 | 1.2 |

The film-forming compositions of Examples 1–6 were applied pigmented basecoat to form color-plus-clear composite coatings electrocoated steel substrates. The pigmented basecoat for Examples 1–6 is commercially available from PPG Industries, Inc. and identified as NHU-9517. The basecoat was pigmented black in color. The electrocoat used on the steel is commercially available from PPG industries, Inc. and is identified as ED-11.

The basecoat was spray applied in two coats to electrocoated panels at a temperature of about 75° F (24° C). A ninety second flash time was allowed between the two basecoat applications. After the second basecoat application, a flash time of approximately five minutes was allowed at 75° F. (24° C.) before the application of the clear coating composition. The clear coating compositions of Examples 1–6 were each applied to a basecoated panel in two coats with ninety second flash at 75° F. (24° C.) allowed between coats. The composite coating was allowed to air flash at 75° F (24° C) for ten to fifteen minutes before baking at 285° F. (141° C.) for 30 minutes to cure both the basecoat and clearcoat. The panels were baked in a horizontal position. The properties of the composite coatings are reported in Table I below.

TABLE I

| Example | Hydroxyl Number of Composition | % OH Functional Resin by Weight | Acid Etch Rating* | Pencil Hardness After 3 Minute Xylene Spot** |
| --- | --- | --- | --- | --- |
| 1 | 0 | 0 | 3 | F |
| 2 | 23 | 20 | 4 | F |
| 3 | 46 | 40 | 5 | F |
| 4 | 69 | 60 | 8 | F |
| 5 | 115 | 100 | 8 | H |
| 6 | 0 | 0 | 3 | H |

TABLE I-continued

| Example | Hydroxyl Number of Composition | % OH Functional Resin by Weight | Acid Etch Rating* | Pencil Hardness After 3 Minute Xylene Spot** |
|---|---|---|---|---|

*Panels were sprayed with a sulfurous acid solution (350 grams deionized water and 12 grams sulfurous acid to give a pH of 2.0 plus or minus 0.1) using a polyethylene spray bottle, giving a distribution of drop sizes up to one quarter inch. Approximately 2.5 to 3.0 grams of solution were applied per 4 × 4 inch panel. The panels were then placed in an oven at 110° F. (43° C.) for twenty minutes. The panels were removed from the oven and the spray/bake procedure was repeated two more times to give a total of 60 minutes at 110° F. (43° C.). After the third cycle the panels were washed with soap and water and dried, then rated for degree of acid etch resistance on a scale of 1–10 (1 = no observable etching; 10 = severe etching).
**Pencil hardness (Gouge hardness) determined by ASTM D 3353-74 was performed immediately after the panel was spotted with a 0.5 inch to 2 inch drop of xylene and wiped dry.

Example 7

A clear film-forming composition was prepared by mixing together the following ingredients:

| Ingredient | Solid weight in grams | Solution weight in grams |
|---|---|---|
| TINUVIN 1130 | 3.5 | 3.5 |
| CYMEL 328[1] | 30.0 | 34.9 |
| carbamate containing acrylic of Example E | 70.0 | 198.4 |
| phenyl acid phosphate | 1.0 | 5.0 |
| water | — | 137.0 |

[1]Waterborne version of CYMEL 327 available from American Cyanamid.

Example 8

A clear film-forming composition was prepared by mixing together the following ingredients:

| Ingredient | Solid weight in grams | Solution weight in grams |
|---|---|---|
| carbamate containing acrylic of Example F | 70.0 | 162.6 |
| CYMEL 303[1] | 30.0 | 30.0 |
| TINUVIN 1130 | 3.5 | |
| DDBSA solution[2] | 1.0 | 5.0 |
| FC 430 solution[3] | 0.1 | 2.0 |
| diisopropanol amine solution[4] | — | 3.9 |
| n-methyl-2-pyrrolidone | — | 5.0 |
| isopropanol | — | 5.0 |
| water | — | 25.0 |

[1]Hexamethoxymethyl melamine resin available from American Cyanamid.
[2]20 weight percent solution of dodecylbenzene sulfonic acid neutralized with diisopropanolamine in deionized water.
[3]Nonionic surfactant available from 3M Corporation.
[4]50 weight percent solution of diisopropanolamine in deionized water.

Example 9

A clear film-forming composition was prepared by mixing together the following ingredients:

| Ingredient | Solid weight in grams | Solution weight in grams |
|---|---|---|
| DDDA/HEEU oligomer of Example K | 70.0 | 116.7 |
| CYMEL 328 | 30.0 | 34.9 |

| Ingredient | Solid weight in grams | Solution weight in grams |
|---|---|---|
| Phenyl acid phosphate solution | 1.0 | 5.0 |
| Tego Wet ZFS 453[1] | 0.09 | 0.36 |

[1]Nonionic surfactant available from Tego Chemie Service GmbH.

Example 10

A clear film-forming composition was prepared by mixing together the following ingredients:

| Ingredient | Solid weight in grams | Solution weight in grams |
|---|---|---|
| carbamate functional acrylic and polyester latex of Example J | 70.0 | 170.61 |
| CYMEL 303 | 30.0 | 30.0 |
| TINUVIN 1130 | 3.5 | 3.5 |
| DDBSA solution | 1.0 | 5.0 |
| FC 430 solution | 0.1 | 2.0 |
| diisopropanol amine solution | — | 3.2 |
| n-methyl-2-pyrrolidone | — | 5.0 |
| isopropanol | — | 5.0 |
| water | — | 58.1 |

Example 11

A clear film-forming composition was prepared by mixing together the following ingredients:

| Ingredient | Solid weight in grams | Solution weight in grams |
|---|---|---|
| carbamate functional acrylic latex of Example M | 70.0 | 172.8 |
| CYMEL 303 | 30.0 | 30.0 |
| TINUVIN 1130 | 3.5 | 3.5 |
| p-TSA solution[1] | 1.0 | 5.0 |
| diisopropanol amine solution | — | 3.5 |
| isopropanol | — | 50.0 |
| water | — | 17.3 |

[1]20 weight percent solution of para-toluene sulfonic acid neutralized with diisopropanol amine in water.

Example 12

A clear film-forming composition was prepared by mixing together the following ingredients:

| Ingredient | Solid weight in grams | Solution weight in grams |
|---|---|---|
| hydroxyl functional acrylic latex of Example N | 70.0 | 174.2 |
| CYMEL 303 | 30.0 | 30.0 |
| TINUVIN 1130 | 3.5 | 3.5 |
| p-TSA solution | 1.0 | 5.0 |
| diisopropanol amine solution | — | 3.5 |
| isopropanol | — | 50.0 |
| water | — | 16.3 |

The film-forming compositions of Examples 7–12 were applied to a pigmented basecoat to form color-plus-clear composite coatings over electrocoated steel substrates. The pigmented basecoat for Examples 7–12 is commercially available from PPG Industries, Inc. and identified as BWB-8555. The basecoat was pigmented black in color. The electrocoat used on the steel is commercially available from PPG Industries, Inc. and is identified as ED-11.

The basecoat was spray applied in two coats to electrocoated steel panals at a temperature of about 75° F. (24° C.) and a relative humidity of about 60%. A ninety second flash time was allowed between the two basecoat applications. After the second basecoat application, a prebake time of approximately five minutes was allowed at 250° F. (121° C.) before the application of the clear coating composition. The clear coating compositions of Examples 7–12 were each applied to a basecoated panel in two coats with a ninety second flash at 75° F. (24° C.) allowed between coats. The composite coating was allowed to air flash at 75° F. (24° C.) for ten to fifteen minutes and to flash at 140° F. (60° C.) for ten to fifteen minutes before baking at 285° F. (141° C.) for 30 minutes to cure both the basecoat and clearcoat. The panels were baked in a horizontal position. The properties of the composite coatings are reported in Table II below.

TABLE II

| Example | Acid Etch Rating |
|---------|------------------|
| 7       | 3                |
| 8       | 3                |
| 9       | 2                |
| 10      | 5                |
| 11      | 5                |
| 12      | 9                |

We claim:
1. A method for applying a composite coating to a substrate which comprises applying to the substrate a colored film-forming composition to form a base coat and applying to said base coat a clear film-forming composition to form a transparent top coat over the base coat characterized in that the clear film-forming composition comprises (1) a polymer or oligomer containing a plurality of terminal or pendant groups of the structure:

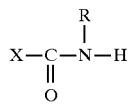

Where X is -N or

and R is H or alkyl of 1—6 carbon atoms or R is bonded to X and forms part of a 5 or 6 membered ring; and (2) an aminoplast crosslinking agent containing methylol and/or methylol ether groups; said clear film-forming composition being crosslinkable through reaction of said pendant or terminal groups with said methylol and/or methylol ether groups; said clear film-forming composition being further characterized as having a calculated hydroxyl value less than 50 based on solid weight of said clear film-forming composition, excluding any hydroxyl functionality associated with N-methylol groups so as to result in a crosslinked coating which has urethane and/or urea crosslinks arising from said reaction of pendant or terminal groups with said methylol and/or methylol either groups.

2. The method of claim 1 in which X is

3. The method of claim 2 in which the polymer or oligomer has on average at least two of said terminal or pendant groups per molecule.
4. The method of claim 3 in which the polymer or oligomer has an equivalent weight of from about 140 to 2500 based on equivalents of said terminal or pendant groups.
5. The method of claim 2 in which R is H.
6. The method of claim 2 in which the aminoplast is a condensate of melamine with formaldehyde and optionally an alcohol containing from 1 to 6 carbon atoms.
7. The method of claim 2 wherein the equivalent ratio of said pendant or terminal groups to methylol or methylol ether groups is from 0.5 to 2:1 and is sufficient to form a crosslinked film.
8. The method of claim 2 wherein the polymer or oligomer is present in the clear film-forming composition in amounts of 50 to 90 percent by weight based on weight of resin solids in the clear film-forming composition.
9. The method of claim 2 wherein the aminoplast is present in the clear film-forming composition in amounts of 10 to 50 percent based on weight of resin solids in the clear film-forming composition.
10. A substrate coated in accordance with claim 1.
11. A method for applying a composite coating to a substrate which comprises applying to the substrate a colored film-forming composition to form a base coat and applying to said base coat a clear film-forming composition to form a transparent top coat over the base coat characterized in that the clear film-forming composition comprises (1) a polymer or oligomer containing a plurality of terminal or pendant urea groups of the structure:

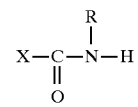

where X is

and R is H or alkyl of 1–6 carbon atoms or R is bonded to X and forms part of a 5 or 6 membered ring; and (2) an aminoplast crosslinking agent containing methylol and/or methylol ether groups;said clear film-forming composition being crosslinkable through reaction of said pendant or terminal groups with said methylol and/or methylol ether groups; said clear film-forming composition being further characterized as having a calculated hydroxyl value less than 50 based on solid weight of said clear film-forming composition, excluding any hydroxyl functionality associated with N-methylol groups so as to result in a crosslinked coating which has urea crosslinks arising from said reaction of pendant or terminal groups with said methylol and/or methylol ether groups.
12. The method of claim 11 in which (1) is an acrylic polymer.
13. The method of claim 12 in which the acrylic polymer has an equivalent weight less than 5000 based on equivalents of said terminal or pendant groups.

14. The method of claim 13 in which the acrylic polymer has an equivalent weight within the range of about 140 to 2500 based on equivalents of said terminal or pendant groups.

15. The method of claim 11 in which (1) is a polymer selected from the class consisting of polyesters, polyurethanes formed from polyisocyanates, and mixtures thereof.

16. The method of claim 15 in which the polymer has on average at least two of said terminal or pendant groups per molecule.

17. The method of claim 16 in which the polymer has an equivalent weight of from about 140 to 2500 based on equivalents of said terminal or pendant groups.

18. The method of claim 11 in which R is H.

19. The method of claim 11 in which the aminoplast is a condensate of melamine with formaldehyde and optionally an alcohol containing from 1 to 6 carbon atoms.

20. The method of claim 11 wherein the equivalent ratio of said pendant or terminal groups to methylol or methylol ether groups is from 0.5 to 2:1 and is sufficient to form a crosslinked film.

21. The method of claim 11 wherein the polymer or oligomer is present in the clear film-forming composition in amounts of 50 to 90 percent by weight based on weight of resin solids in the clear film-forming composition.

22. The method of claim 11 wherein the aminoplast is present in the clear film-forming composition in amounts of 10 to 50 percent by weight based on weight of resin solids in the clear film-forming composition.

* * * * *

UNITED STATES PATENT AND TRADEMARK OFFICE
CERTIFICATE OF CORRECTION

PATENT NO. : 5,814,410
DATED : September 29, 1998
INVENTOR(S) : Debra L. Singer et al.

It is certified that error appears in the above-identified patent and that said Letters Patent is hereby corrected as shown below:

Col. 21, line 67, "either" should be --ether--.

Col. 22, line 5, " —C| " should be -- —O| --.

Signed and Sealed this

First Day of June, 1999

Attest:

Attesting Officer

Q. TODD DICKINSON

Acting Commissioner of Patents and Trademarks